United States Patent
Newstead et al.

[15] 3,662,865
[45] May 16, 1972

[54] AUTOMATIC ADJUSTER FOR SHOE DRUM BRAKE

[72] Inventors: Charles Newstead; Norman S. Moss, both of Birmingham, England

[73] Assignee: Girling Limited, Birmingham, England

[22] Filed: June 23, 1970

[21] Appl. No.: 49,114

[30] Foreign Application Priority Data

June 25, 1969 Great Britain.....................32,109/69

[52] U.S. Cl. .....................................188/196 F, 188/79.5 K
[51] Int. Cl. ......................................................F16d 65/56
[58] Field of Search.....................188/79.5 K, 75.9 P, 196 F, 188/196 BA, 196 D

[56] References Cited

UNITED STATES PATENTS

| | | | |
|---|---|---|---|
| 2,002,139 | 5/1935 | Des Rosiers | 188/79.5 K |
| 2,554,065 | 5/1951 | Shields | 188/79.5 K |

FOREIGN PATENTS OR APPLICATIONS 904,072    8/1962    Great Britain......................188/196 F Primary Examiner—Duane A. Reger
Attorney—Scrivener, Parker, Scrivener and Clarke

[57] ABSTRACT

A bolt on adjuster unit for auto-adjustment of the manual adjuster spindle of a drum brake comprises an actuating spring means which is loaded progressively and incrementally by successive mechanical input signals corresponding to brake shoe movements; when a predetermined number of signals have been received, the spring means is automatically released to drive a transfer means which operates to effect adjustment of the spindle.

The unit also exhibits a novel manual re-setting arrangement in which a final driven member of the mechanism is formed with a ring of gear teeth in constant mesh with a pinion. A manually depressable and rotatable plunger is used to engage and rotate the pinion and driven member, and at the same time to break the driving engagement between the driven member and the rest of the transmitting mechanisms.

8 Claims, 9 Drawing Figures

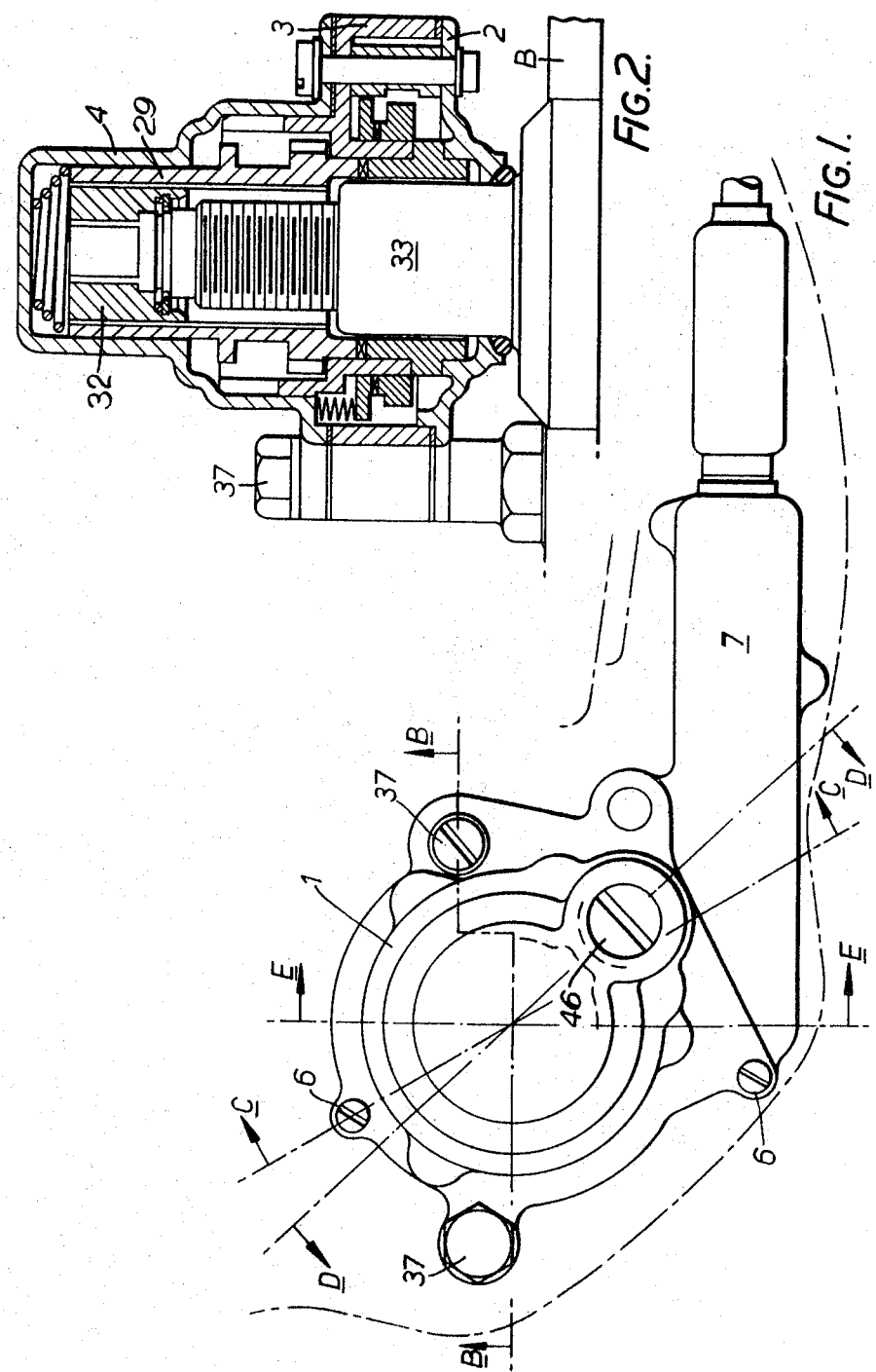

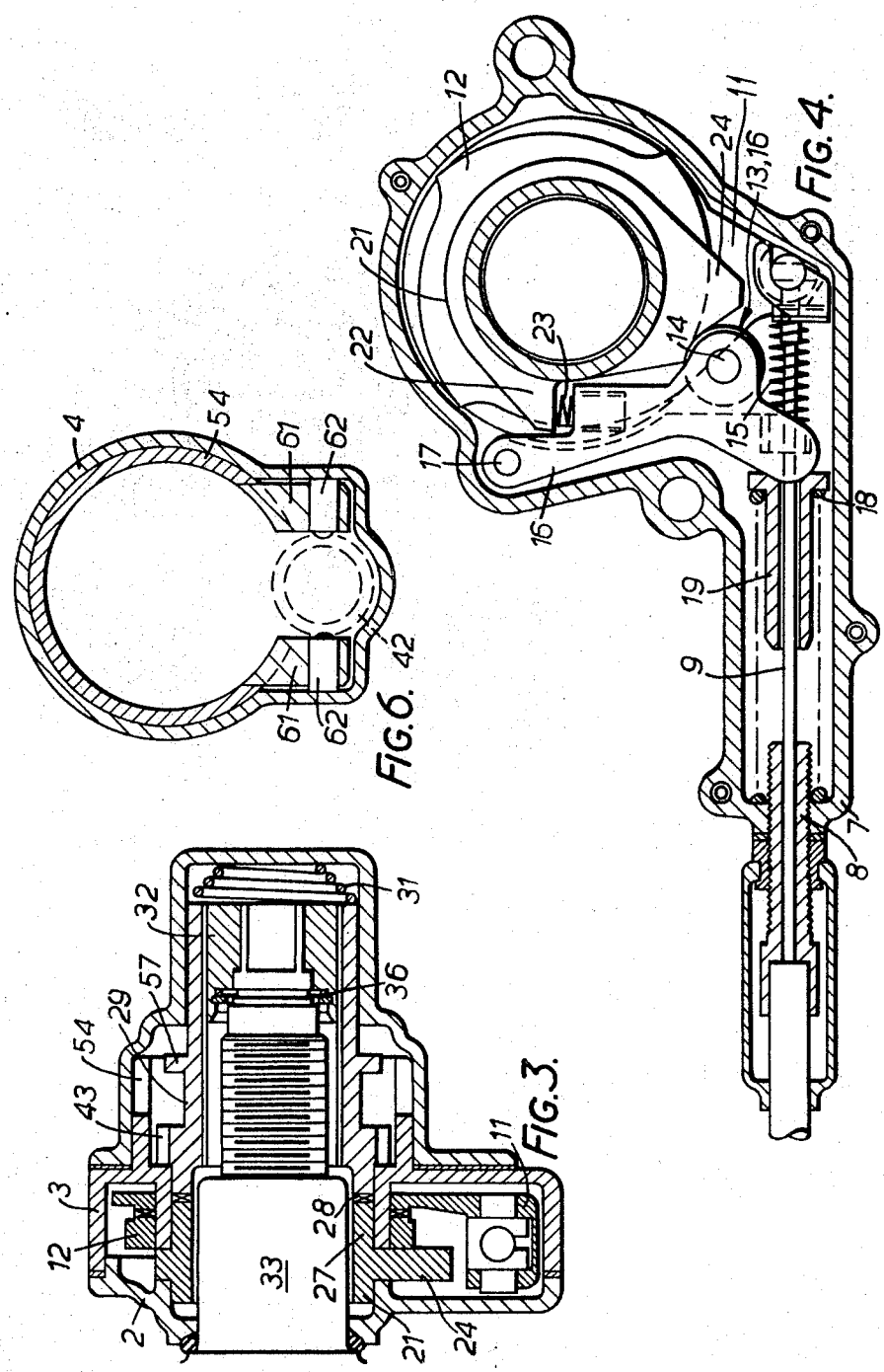

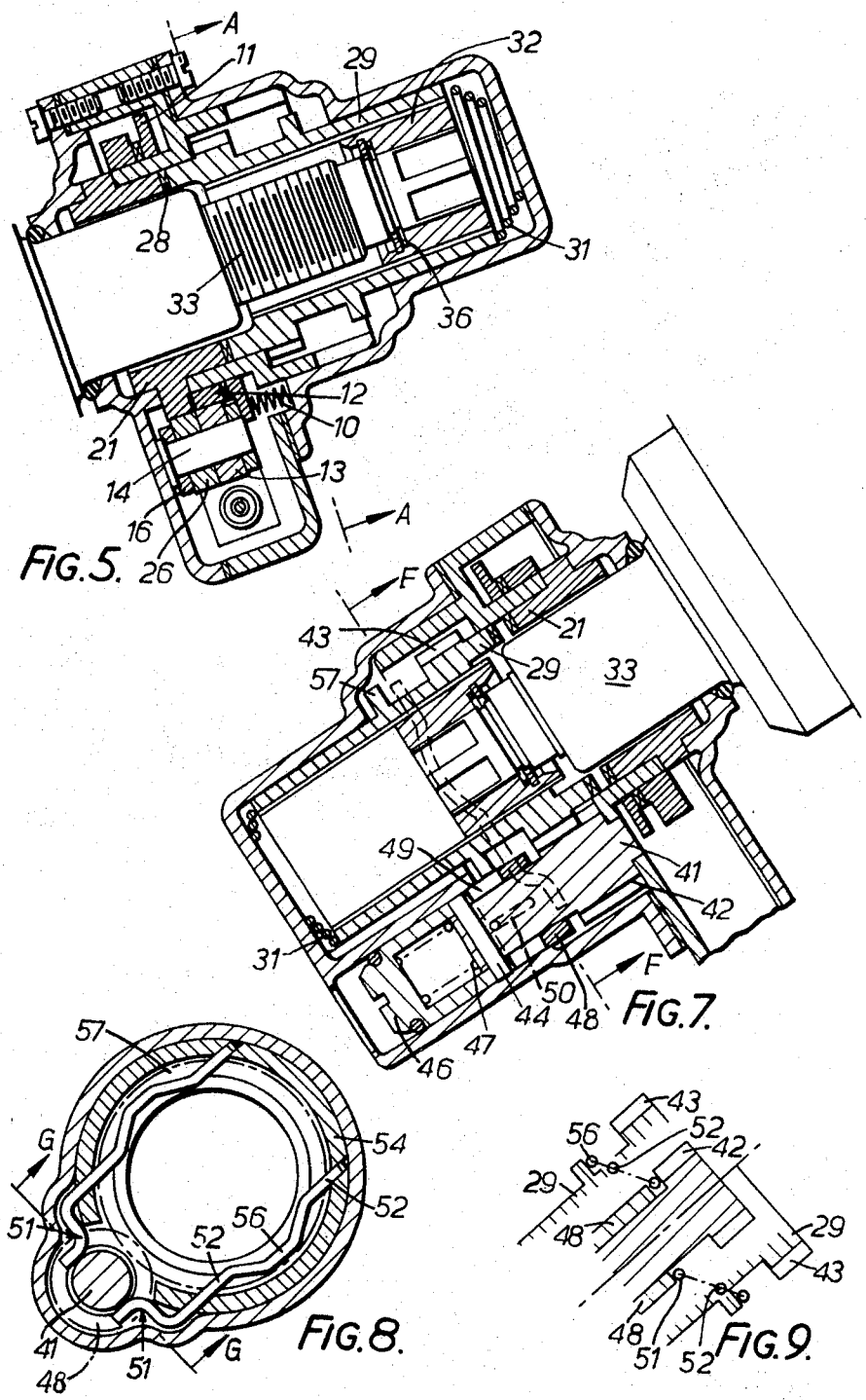

AUTOMATIC ADJUSTER FOR SHOE DRUM BRAKE

This invention relates to automatic adjusters for internal shoe vehicle drum brakes, and provides an adjuster unit which is constructed and arranged for use with existing vehicle drum brakes having only a conventional, manual adjuster.

In conventional drum brakes, the manual adjuster comprises a spindle projecting through a hole in the brake back plate, on the inboard side thereof, and having a squared outer end for rotation by a spanner to effect adjustment to compensate for wear of the brake linings.

In its application to an automatic adjuster unit for such a brake, the present invention provides a unit which is secured in use to the brake back plate over the adjuster spindle in driving engagement therewith. In use, the adjuster unit will be operated in response to a predetermined travel of the brake shoes (or one of them) which travel is transmitted to the unit as a mechanical input signal.

In the know adjusters of this type of which we are aware mechanical input signals corresponding to brake shoe movements are applied to the brake adjuster spindle in such a way that one such signal, corresponding to a single, excessive brake shoe movement (indicating that adjustment is required) causes an incremental movement of the adjuster spindle to be effected. Such an arrangement leads to relatively heavy loads being applied to the moving parts of the adjuster unit, including those parts whose main function sense and transmit the incoming signal. Heavy loading of these parts obviously introduces the possibility of excessive wear and lost motion arising, rendering the adjuster unit less sensitive and accurate in its operation.

Furthermore, it is possible for the signal transmitted by the brake to be misleading. For example, if the brakes are applied heavily when the drum is in an overheated condition, the movement of the brake shoes will be larger than usual, not because of wear of the shoe linings, but because of the structural deflections and temporarily increased drum diameter. If a signal which is falsely magnified in this way is transmitted to the adjuster, over-adjustment can take place. Another type of signal distortion arises in the drum brakes of conventional design, in which the brake shoes are engaged at their tips by inclined abutment faces, and move progressively along these faces as shoe lining wear increases. As a result, there is an additional movement of the brake shoes away from their original ("new shoe") datum or retracted position, and this also distorts the input signal to the adjuster. One solution to this particular problem is to take the signal from the wheel cylinder tappets, but this is inconvenient and consumes space in an area where space is at a premium.

The present invention aims at reducing these difficulties.

In accordance with the invention, there is provided an automatic adjuster unit for use with an internal shoe drum vehicle brake of the type having a rotary adjuster spindle resilient means arranged to be progressively loaded in response to a succession of mechanical input signals derived in use from shoe movements on brake application and release, the said spring means being released in response to completition of a predetermined number of such movements to effect partial rotation of a driven member which is drivingly coupled, in use, to the adjuster spindle of the brake on which the unit is mounted.

More specifically, the invention provides an automatic adjuster unit for an internal shoe drum vehicle brake having an adjuster spindle projecting through the back plate thereof, the unit comprising a housing for attachment to the back plate an input member adapted to be oscillated in use by successive mechanical input signals corresponding to shoe travel upon brake application and release, a rotary cam coupled to the input member by a uni-directional drive coupling, resilient means arranged to be progressively loaded by successive incremental movement of the cam, stored energy in the resilient means being released in response to completion of a predetermined number of such incremental movements, to effect partial rotation of a driven member which is drivingly coupled in use to the adjuster spindle of the brake.

With these arrangements, the loading on those parts of the adjuster which receive the incoming signal is greatly reduced; the fact that a number of successive signals is required to effect one step of adjustment reduces the risk of over-adjustment due to a single abnormal signal being received; and the fact that each input signal is transferred to and stored in the resilient means, instead of being transmitted direct to effect an adjustment, makes it possible to cater for changes in the datum position of the brake shoes by allowing for corresponding changes in datum position in the adjuster unit, from which it follows that the signal can be taken direct from one or both of the brake shoes.

One constructional form of the invention will now be described, by way of example only, with reference to the accompanying drawings, in which, FIG. 1 is a side view of the adjuster unit;
FIG. 2 is a section on the line BB of FIG. 1;
FIG. 3 is a section on the line EE of FIG. 1;
FIG. 4 is a view from the other side, with the cover removed to reveal the interior;
FIG. 5 is a section on the line CC of FIG. 1;
FIG. 6 is a section on the line AA of FIG. 5;
FIG. 7 is a section on the line DD of FIG. 1;
FIG. 8 is a section on the line FF of FIG. 7;
FIG. 9 is a scrap section on the line GG of FIG. 8.

The automatic adjuster unit shown in the drawings comprises a housing 1 in three parts 2, 3 and 4 secured together by bolts 6. The housing member 3 has a tubular extension 7 in which is adjustably secured an adjuster ferrule 8 of a sheathed Bowden type cable. The cable proper 9 is coupled at its free end to an oscillating input member 11 journaled for rotation in the housing 1. A coil compression spring 15 urges the input member 11 to its extreme anti-clockwise position, as viewed in FIG. 4. The input member 11 is formed on one side face with a ring of ratchet teeth co-operating with similar teeth on the adjacent side face of a rotary cam 12, shown in FIG. 4 as having four lobes, although it could have more or less lobes if desired. The sets of ratchet teeth are yieldingly pressed into co-operating engagement by coil springs 10, one of which is seen in FIG. 5.

The cam profile is engaged by a roller follower 13 journaled on a pin 14 carried in the fork of a bifurcated follower lever 16 pivotally mounted in the housing 1 by a pivot pin 17. The lever 16 is biassed in an anti-clockwise direction, towards its extreme position shown in FIG. 4, by a lever spring 18, contained in the tubular extension 7 and acting upon the lever through the intermediary of a guide bush 19.

Also mounted in the housing 1 is a transfer member 21 having an abutment lug 22 engaged by a short coil compression spring 23, the other end of which is received in a socket in the follower lever 16. The spring 23 acts to maintain a cam portion 24 of the member 21 in engagement with a second roller follower 26 coaxial with the roller follower 13. The member 21 also has a tubular extension or boss 27, the outer end of which is formed with a face ratchet 28 co-operating with a similar face ratchet formed at the adjacent end of a rotary driven member 29 which is biassed into engagement with the face ratchet 28 by a coil spring 31. The bore of the driven member 29 is formed with axial splines for keying engagement with a drive bush 32 having a square central hole to fit over the adjuster spindle 33 of a conventional internal shoe drum brake. The drive bush 32 is secured to the spindle 34 by split rings 36.

The basic operation of the above described mechanism will now be described before passing on to ancillary constructional features.

In use, the housing 1 of the unit is secured to a brake back plate B by means of bolts 37, with the drive bush 32 engaged over the spindle 33 in the manner indicated above. The cable 9 is connected to a suitable mechanism sensing brake shoe movement and with the brakes off, the adjuster unit parts take up the positions shown in FIGS. 2 to 5.

On application of the brakes the cable 9 pulls the input member 11 in a clockwise direction (as viewed in FIG. 4) and if the input member drives the cam member 12 through one tooth space of the ratchet teeth 28, the follow lever 16 is displaced a small distance in the clockwise direction (as viewed in FIG. 4); the transfer member 21 follows this movement under the action of the spring 23, and the ratchet teeth of the transfer member 21 and the driven member 29 start to slide over each other by one increment of a tooth pitch. Upon brake release, the input member 11 returns to its initial position to engage the next ratchet tooth on the cam 12.

Upon successive brake applications, the cam 12 is thus advanced stepwise towards its next following top dwell, and when the roller 13 passes over the top dwell, the lever 16 is driven back by the spring 18 to its illustrated position, carrying with it the transfer member 21 which has by this stage engaged the next tooth on the driven member 29, so that in the return movement of the transfer member, the driven member 29 is rotated through one tooth space and this rotation is applied to the adjuster spindle 33 to effect a brake adjustment.

Thus it will be seen that several successive oscillations of the input member and corresponding stepwise movements of the cam 12 are required to load up the spring 18 before the energy of that spring is released to effect an increment of movement of the driven member 29 and the adjuster spindle 33. This arrangement relieves the members 11 and 12 of any substantial load in acting to transfer incremental movement to the transfer member 21. Any change in the shoe datum position (i.e. the position assumed by the shoes when the brake is released) is transferred automatically to the input member 11, which simple returns, upon brake release, to the limit of return movement permitted by the cable 9. The input member 11 will still operate, from its new datum position, to transfer subsequent shoe movement signals to the rotary cam 12, operation of which is therefore unaffected by such changes of datum position.

The adjuster unit is further provided with a manual resetting means and anti-vibration means for preventing undesired rotation of the adjuster mechanism, both of which will now be described in detail.

The manual resetting means comprises a rotatable pinion gear member or spindle 41 journaled in the housing 1, with its axis parallel to that of the adjuster spindle and having a ring of gear teeth 42 in sliding, meshing engagement with a ring of gear teeth 43 on the periphery of the driven member 29. Near its outer end, the spindle 41 has a radially projecting cross-pin 44, acting as a driven dog. A cup 46 mounted on the end of the spindle 41 is axially movable relative thereto, and is biased away from the cross-pin 44 by a spring 47. In FIG. 7 this spring is shown in a depressed condition, so that open ended axial slots in the cup 46 engage over the cross-pin 44 to provide a driving rotary engagement between the cup and the spindle. It should be understood that the cup is normally clear of the cross-pin to permit relative rotation between the cup and the spindle.

A sleeve 48 slidably mounted on the spindle has one pair of diametrically opposed axial slots 49 normally engaged over the cross-pin 44, and a second pair of slots 50 co-operating with a second cross-pin, permanently keying the sleeve against rotation relative to the spindle.

As so far described, it will be understood that the spindle 41 can be rotated by inserting a screw driver in the outer end of the cup 46, first to rotate the cup to register with the cross-pin 44, then to depress the cup against spring 47, which effects axial displacement of the sleeve 48 towards a shoulder formed at the side of the ring of gear teeth 42, and finally to rotate the cup and with it the spindle 41. This position of the parts is shown in FIG. 7.

Engaged in the space between the sleeve and the shoulder is one offset end 51 of each of two levers in the form of cranks (see FIGS. 7, 8 and 9). Each crank has two aligned portions 52 journaled in a split ring member 54 secured in the housing 1. Each crank has a second offset portion 56 which engages a shoulder formed by an annular flange 57 on the driven member 29.

In the normal, operative position of the parts, the member 29 is urged towards the transfer member 27 by the coil spring 31. The flange 57 bears against the crank offset portion 56 holding the cranks in the position illustrated in the lower half of FIG. 9, in which the offset ends 51 force the sleeve 48 axially outwardly. When the cup 41 and sleeve 48 are depressed manually, the crank is caused to pivot in the opposite direction, forcing the member 29 axially out of engagement with the face ratchet 28 of member 29, compressing spring 31, freeing the driven member 29 for rotation relative to transfer member 21 to enable the adjuster spindle 33 to be manually reset by rotation of spindle 41.

Thus, to summarize, depression of the cup 48 establishes a driving connection between the cup and spindle 41, and breaks the driving connection between the transfer member 21 and driven member 29, and rotation of the cup and spindle then effects rotation of the driven member 29 and adjuster spindle 33.

The anti-vibration means includes the split ring member 54, which has at its free ends a pair of axially offset, outwardly projecting lugs 61 carrying spring loaded ball units 62, the balls of which engage in the spaces between adjacent gear teeth of the ring of gear teeth 42 on spindle 41. The spring balls thus restrain the spindle and driven member 29 against undesired rotation, but of course permit automatic adjustment and manual resetting in the manner described above. Such undesired rotation could otherwise occur due to the frictional engagement in the ratchet 28 during stepwise movement of the transfer member 21. Or it could arise from vibration in the brake causing rotation of the adjuster spindle 33, which rotation could cause corresponding rotation of the member 21 against the action of spring 23.

The unit is of course completed by gaskets and running seals to protect it against the ingress of dirt and moisture.

We claim:

1. In an adjuster unit for use with a vehicle internal shoe drum brake having a back plate and an manual adjuster spindle projecting therethrough, said unit comprising a housing and a signal transmitting mechanism within said housing whereby in use with said housing secured to said back plate and said mechanism engaged with said spindle mechanical input signals corresponding to brake shoe movement are transmitted to said spindle to effect auto-adjustment thereof, the improved signal transmitting mechanism which comprises:
   resilient means;
   means for transmitting successive input signals to said resilient means for progressive incremental loading of the same;
   means responsive to completion of a predetermined number of input signals for releasing energy stored in said resilient means;
   and transfer means for transmitting said released energy to drive said adjuster spindle.

2. The improved adjuster unit of claim 1, wherein said signal transmitting mechanism comprises an oscillating input member; a rotary cam in uni-directional drive engagement with said input member and a cam follower member driven by said cam to load said resilient means incrementally as said cam is stepped round by said input member, said cam being adapted to release said follower and resilient means at selected operation positions of said cam.

3. The improved adjuster unit of claim 1, wherein said transfer means comprises a rotary transfer member rotatable by said resilient means and a final driven rotary member coaxial with said transfer member and having uni-directional driven engagement therewith, said driven member being adapted for driving engagement with said adjuster spindle.

4. The improved adjuster unit of claim 1, wherein said signal transmitting member comprises an input member journaled for reciprocation about an axis in said housing; a rotary cam rotatable about said axis and in uni-directional driven engagement with said input member; a pivoted lever cam follower operatively engaged with said rotary cam and with said resilient means; a transfer member mounted for rotation about said axis and drivingly engaged with said pivoted lever cam follower; and a final driven member mounted for rotation about said axis in uni-directional driven engagement with said transfer member and adapted for driving engagement with said adjuster spindle; and wherein successive input signal applied in operation to said rotary cam by said input member effect stepping of said cam and incremental loading of said resilient means which, when released drive said transfer member and said driven member.

5. The improved adjuster unit of claim 1, further comprising manual reset means including a final driven member of said mechanism having a ring of gear teeth therein, a rotatable pinion gear member in meshing engagement with said ring of gear teeth, a manually operable plunger mounted co-axially with said gear member for movement into and out of rotary driving engagement therewith and means responsive to movement of said plunger into driving engagement to disengage said driven member from said mechanism.

6. The improved adjuster unit of claim 5, wherein the last said means comprises pivotal lever means engageable respectively by said plunger and with said driven member.

7. The improved adjuster of claim 5 further comprising spring loaded plunger means yieldingly engaged with said pinion gear member to restrain undesired rotation of said pinion gear member and thus of driven member.

8. Means for operating an adjuster of shoe drum brakes in response to brake shoe wear, said adjuster including spindle means rotatable in a predetermined direction for effecting adjustment of said brakes, signal transmitting means responsive to brake shoe movement, resilient energy storage means, means operatively connecting said signal transmitting means with said resilient energy storage means and being constructed and arranged to progressively incrementally load said resilient means in response to signals derived from successive brake shoe movements, means responsive to a predetermined number of said signals for releasing the energy stored in said resilient means, and transfer means for transmitting said released energy to said spindle means to rotate the same in its predetermined adjusting direction.

* * * * *